(Model.)

2 Sheets—Sheet 1.

H. P. TENANT.
FORCE FEED SEEDING MACHINE.

No. 246,921.                    Patented Sept. 13, 1881.

WITNESSES

INVENTOR (Model.)

2 Sheets—Sheet 2.

H. P. TENANT.
FORCE FEED SEEDING MACHINE.

No. 246,921.  Patented Sept. 13, 1881.

WITNESSES
Fred. G. Dieterich
P. C. Dieterich

INVENTOR
H. P. Tenant
per
DeWitt C. Allen, Attorney

UNITED STATES PATENT OFFICE.

HANSON P. TENANT, OF RICHMOND, INDIANA, ASSIGNOR OF ONE-HALF TO GAAR, SCOTT & CO., OF SAME PLACE.

FORCE-FEED SEEDING-MACHINE.

SPECIFICATION forming part of Letters Patent No. 246,921, dated September 13, 1881.

Application filed July 25, 1881. (Model.)

*To all whom it may concern:*

Be it known that I, HANSON P. TENANT, a citizen of the United States, residing at Richmond, in the county of Wayne and State of Indiana, have invented certain new and useful Improvements in Force-Feed Seeding-Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in force-feed seeding-machines, and more particularly to the class employing what is termed the "screw-feed;" and the invention consists in novel features of construction and combination and arrangement of parts, all as will be hereinafter fully described, and particularly designated in the claims.

Figure 1:
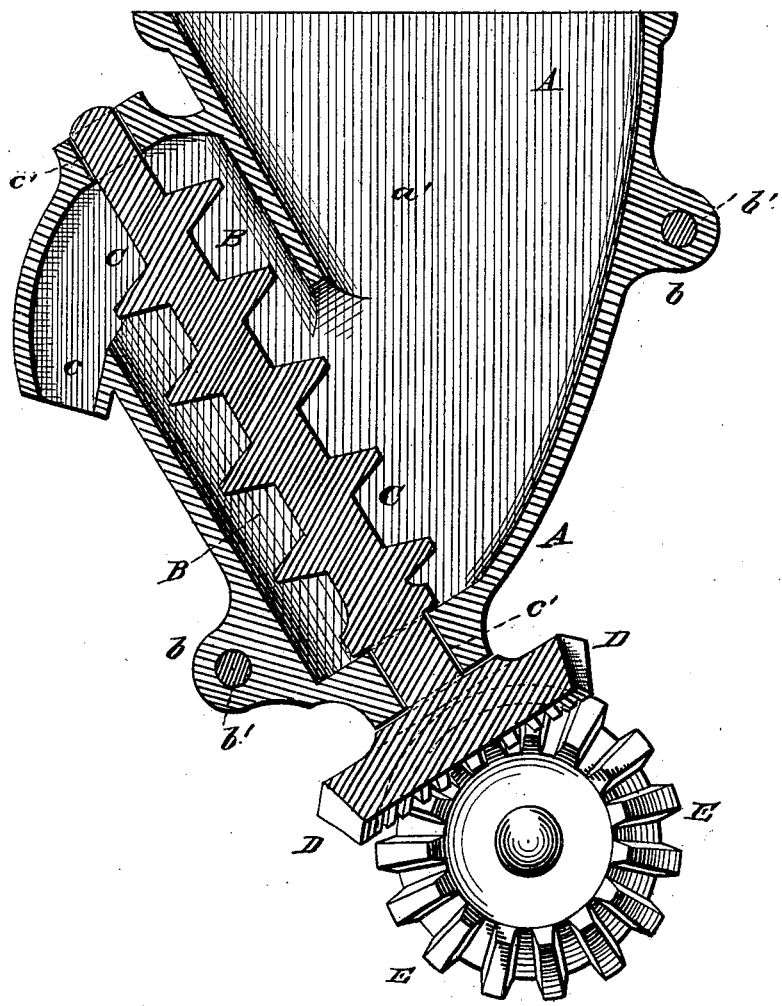
Figure 2:
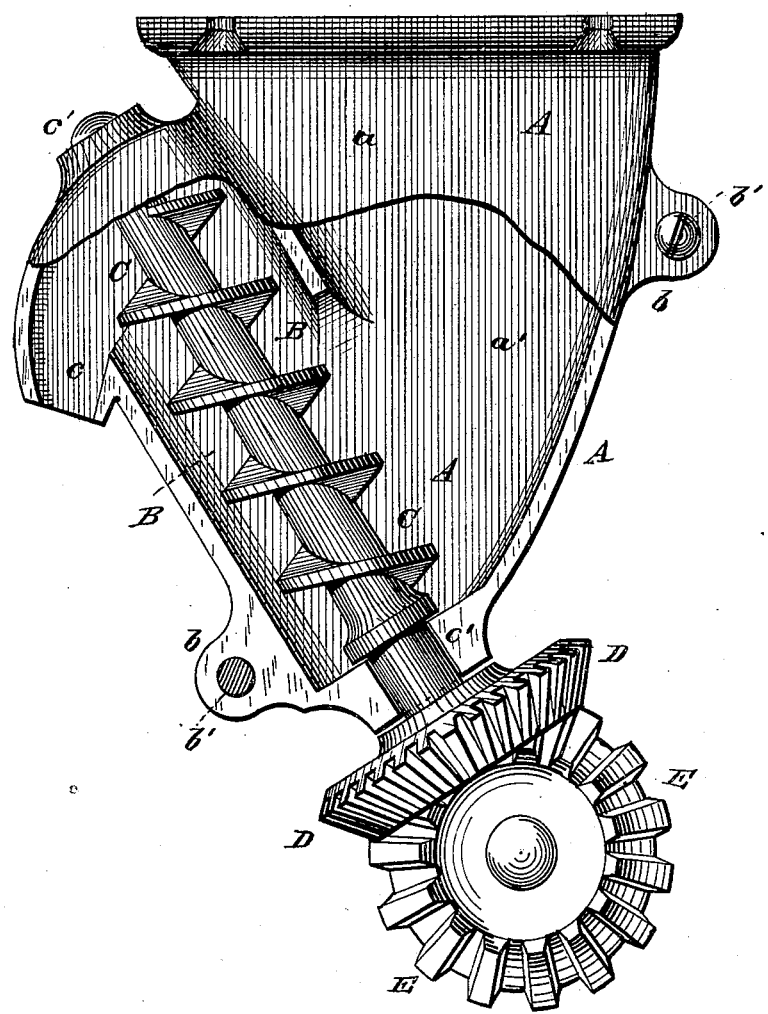

Referring to the accompanying drawings, Figure 1 represents a vertical longitudinal section of my improved machine. Fig. 2 represents a side elevation with a portion of the case or cup broken away to show the feeding mechanism.

A in the drawings represents the seed cup or case, which, with the feed-tube B, is formed or cast into two sections, $a$ $a'$, and subsequently secured together by bolts, rivets, or other devices, $b'$, passing through projecting eye-lugs $b$. The feed-tube B may be arranged either in front or rear of the cup or case A, or at any other suitable point deemed most expedient, and either in an upright or oblique position relative thereto. The feed-tube B communicates with the cup or case at or near the bottom thereof, and extends to nearly its top, and is provided with the usual discharge-opening, $c$, near the upper end thereof.

C represents a feed worm or screw, arranged in the feed-tube B, with its bearings $c'$ $c'$ in the upper end and in the lower end of said tube, or in the bottom of the cup or case A. The feed worm or screw C is provided at the end thereof with a gear, D, all cast in one solid piece, with chilled journals on same, the feed worm or screw and gear D receiving motion through the medium of gear E meshing therewith. On the sides of the feed-tube B are provided the usual bearings, from which the discharge-spout is suspended.

It will be observed that in my machine the feeding mechanism is arranged in a feed-tube located outside of the main portion of the seed cup or case, with which it communicates, in contradistinction to that class of force-feed seeding-machines having the feed mechanism or wheel located in the main portion of the seed cup or case; and by having the feed-tube and feeding mechanism arranged in an upright or oblique position relative to the seed cup or case all jarring or shaking out of the grain is obviated or prevented when the feed mechanism is thrown out of gear, and the amount of grain or seed to be sown is regulated by shifting the gear, making the speed of the feeding mechanism slower or faster, as may be desired, without a change of gear.

I do not wish to be limited to the precise construction herein shown, as various modifications may be made without departing from the spirit of my invention, as one of the essential features is in having the feed-tube and feeding mechanism arranged in an upright or oblique position to the seed cup or case, for the purpose before described.

The screw or worm should be made somewhat smaller in diameter than the inside diameter of the feed-tube, so as to leave a space of three-sixteenths or one-fourth inch between the circumference of screw or worm and inside of tube, whereby the grain will fill up said space, and thus prevent any grain from being mashed between screw or worm and inside of tube.

Having thus fully described my invention, what I claim as new, and desire to secure by Letters Patent, is—

1. In a seeding-machine, the combination, with a seed cup or case, of a feed-tube communicating therewith at or near its bottom, and arranged in an upright or oblique position relative to said seed case or cup, and mechanism, substantially as described, arranged in said tube for continuously conveying grain discharged therein from the cup or case toward the upper end of said tube, substantially as and for the purpose specified.

2. In a seeding-machine, the combination, with a seed cup or case, of a feed-tube communicating therewith at or near its bottom and arranged in an upright or oblique position relative thereto, and a feed worm or screw arranged in said feed-tube for conveying grain discharged therein from the cup or case toward the upper end of said tube, substantially in the manner herein shown and described.

3. In a seeding-machine, a worm or screw and gear cast in one solid piece, with chilled journals on same, substantially as herein shown and described.

4. In a seeding-machine, the combination of a seed cup or case and a feed-tube arranged in an upright or oblique position relative thereto, said seed case or cup and feed-tube formed in two sections, and a feed worm or screw or continuously-feeding mechanism arranged in said tube, substantially in the manner herein shown and described, and for the purpose specified.

5. In a seeding-machine, the combination of a seed cup or case and feed-tube formed in two sections, said tube arranged relatively to said cup or case as shown, and provided with a bearing at its upper end, a feed worm and gear, D, cast in one piece with chilled journals on same, and an operating-gear meshing with the gear D, substantially in the manner as and for the purpose herein shown and described.

6. In a seeding-machine, the combination, with a seed cup or case and a feed-tube communicating therewith at or near its bottom and arranged in an upright or oblique position relative thereto, of a feed screw or worm adapted to work therein, and having its diameter smaller than the inside diameter of said tube, whereby a space is left between its circumference and inside of tube, substantially as and for the purpose specified.

In testimony whereof I affix my signature in presence of two witnesses.

HANSON P. TENANT.

Witnesses:
E. H. DENNIS,
WM. W. GAAR.